US012241821B1

(12) United States Patent
Alsayegh et al.

(10) Patent No.: US 12,241,821 B1
(45) Date of Patent: Mar. 4, 2025

(54) METHOD FOR DETERMINING PHYSICAL STABILITY OF SUSPENSIONS

(71) Applicant: KUWAIT UNIVERSITY, Safat (KW)

(72) Inventors: Naser Alsayegh, Safat (KW); Shikha Ebrahim, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/653,694

(22) Filed: May 2, 2024

(51) Int. Cl.
| | |
|---|---|
| *G01N 15/04* | (2006.01) |
| *B01F 23/50* | (2022.01) |
| *B01F 35/214* | (2022.01) |
| *B01F 35/22* | (2022.01) |
| *B01F 35/92* | (2022.01) |
| *G01N 15/00* | (2006.01) |

(52) U.S. Cl.
CPC ............. *G01N 15/04* (2013.01); *B01F 23/51* (2022.01); *B01F 35/2144* (2022.01); *B01F 35/2209* (2022.01); *B01F 35/92* (2022.01); *G01N 2015/0053* (2013.01)

(58) Field of Classification Search
CPC ...... G01N 15/04; B01F 23/023; B01F 23/024
USPC ....................................... 366/142, 144, 145
See application file for complete search history.

(56) References Cited

U.S. PATENT DOCUMENTS

| | | | | |
|---|---|---|---|---|
| 2003/0128626 | A1* | 7/2003 | Verkerk | ................ B01F 35/712 366/140 |
| 2010/0202245 | A1* | 8/2010 | Brannon | ................ G01N 15/04 366/152.3 |
| 2024/0142360 | A1* | 5/2024 | Takahashi | ................ G01N 1/44 |

FOREIGN PATENT DOCUMENTS

CN          111821435 A          10/2020

OTHER PUBLICATIONS

Eren Ozkur et al., "Thermal camera utilization for stability assessment of nanofluids" International Gap Summit Scientific Research Congress Jul. 2022.
Yanfeng Chen et al., "A novel CNT encapsulated phase change material with enhanced thermal conductivity and photo-thermal conversion performance", DOI: https://doi.org/10.1016/j.solmat.2018.04.034 Sep. 2018.

\* cited by examiner

*Primary Examiner* — David L Sorkin
(74) *Attorney, Agent, or Firm* — Nath, Goldberg & Meyer; Joshua B. Goldberg

(57) ABSTRACT

A method and system for dynamically determining and adjusting a dispersion stability of particles in a suspension. The system includes a thermal imaging camera configured to determine movement of the particles in the suspension; and a mixing device, wherein the mixing device is configured to stir the suspension to dynamically maintain the suspension at a desired dispersion stability and temperature.

11 Claims, 3 Drawing Sheets

METHOD FOR DETERMINING PHYSICAL STABILITY OF SUSPENSIONS

BACKGROUND

1. Field

The present disclosure provides a method for determining the distribution of particles in a suspension, and particularly, to the physical stability of suspensions.

2. Description of the Related Art

Suspensions are advanced types of fluids that contain dispersed solid particles. These particles are usually in the range of nanometers (nm) to micrometers (μm) in size. When suspensions are fabricated from particles in the nanoscale they can be referred to as 'nanofluids', whereas suspensions made of micrometer dispersions can be referred to as 'microfluids.' Such advanced types of fluids are generally targeted towards heat transfer applications (e.g., heat exchangers working fluids). However, they can also be utilized by the medical sector in the form of medications or inner body diagnostic fluids (e.g., radioactive technetium imaging). They can be used in the petroleum industry to improve the combustion efficiency of fuel products or enhance the crude oil recovery at the flooding stage. They can also be used as lubricants for mechanical parts.

There are mainly two approaches to produce suspensions. The first route is known as the one-step (or single-step) method and the second technique is called the two-step method.

In the single-step approach, particles are formed and dispersed within the hosting fluid in a single stage. The advantages of this approach are that the suspension has higher dispersion physical stability, and the need to deal with dry powder, their transport, and storage allocation, is avoided. However, this method of production is always associated with residuals that are hard to remove, because of incomplete reactions, and can only be used to fabricate specific combinations of particles and base fluids. On the other hand, the two-step method uses pre-prepared powders, after which they are added and dispersed in any non-dissolving base fluid through a mixing device, such as ultra-sonicator, homogenizer, or a magnetic stirrer. The advantages of this approach are that any type of suspension can be manufactured, minimum level of experience is required, the powders are commercially available on a wide scale, and can be used for both small- and large-scale production. Due to the previous advantages, this method of production has always been favorable for many researchers in the field of advanced fluids. Suspensions made using the two-step method approach have typically had a lower level of dispersion and physical stability than the one-step method In order to harness the full potential of suspensions, the dispersed particles need to be homogeneously distributed within the hosting base fluid. This can be generally achieved via the appropriate selection of particle material and type of base fluid combination, adequate mixing duration, employment of surfactant, or surface functionalizing the particles surface before utilizing them. Furthermore, there are many ways to determine the dispersion stability of the suspension. For example, scholars have been using different methods to determine the physical stability of their fabricated suspensions, which include sedimentation photographical capturing method; dynamic light scattering (DLS); zeta potential analysis; 3-ω (3 omega) approach; scanning electron microscopy (SEM) analysis; transmitted electron microscopy (TEM) characterization; spectral analysis; centrifugation method; and particles size analyzer.

From the previously mentioned methods, the particles size analyzer is the only technique that determines the physical stability of suspensions in a dynamic flow condition, which is the actual condition that any suspension would experience in any real application for which it is used. Nevertheless, this method of evaluation has continuously been reported to overestimate the size of the dispersed particles. The size of the dispersed particles can be overestimated by 2 to 10 nm higher than actual. Occasionally, this method can overpredict the amount of particles in a suspension because, in most cases, it assumes that the shadow of a particle is another particle. Due to the aforementioned facts, this technique cannot be considered as a reliable evaluation of the physical dispersion stability of any suspension. In addition to the previous dynamic evaluation method, a method was developed in 2022 by Alsayegh and Bahman which relies on linking the changes in suspensions viscosity and pumping power to the agglomeration of the hosted particles. Although the proposed method was shown to be successful, it only provides relative measurements and does not provide information on the formed agglomerated particles size. Therefore, it can be classified as a qualitative approach for determining the dispersed particles stability in flowing suspensions.

Thus, an efficient, rapid, cost-effective, and portal method for dynamically determining and adjusting a dispersion stability of particles in a suspension is needed.

SUMMARY

The present subject matter can provide a method for dynamically determining and adjusting a dispersion stability of particles in a suspension.

In one embodiment, the present subject matter relates to a method for dynamically determining and adjusting a dispersion stability of particles in a suspension, including providing a suspension having an initial temperature and an initial dispersion stability; heating or cooling the suspension at a constant temperature; aiming a thermal camera at the suspension; capturing, using the thermal camera, a thermal radiation emitted from the suspension; converting, using a computer processor, the thermal radiation into a visual thermal image; analyzing, using the computer processor, the visual thermal images to calculate the dispersion stability and temperature of the suspension; and mixing the suspension to dynamically maintain the suspension at the initial temperature and the initial dispersion stability.

In one embodiment, the present subject matter relates to a system for dynamically determining and adjusting a dispersion stability of particles in a suspension, the system comprising: a thermal imaging camera configured to capture thermal radiation emitted from the suspension; and a mixing device, wherein the mixing device is configured to provide stirring to the suspension to dynamically maintain the suspension at a desired dispersion stability and temperature.

These and other features of the present subject matter will become readily apparent upon further review of the following specification.

DETAILED DESCRIPTION OF THE PREFERRED EMBODIMENTS

Figure 1:
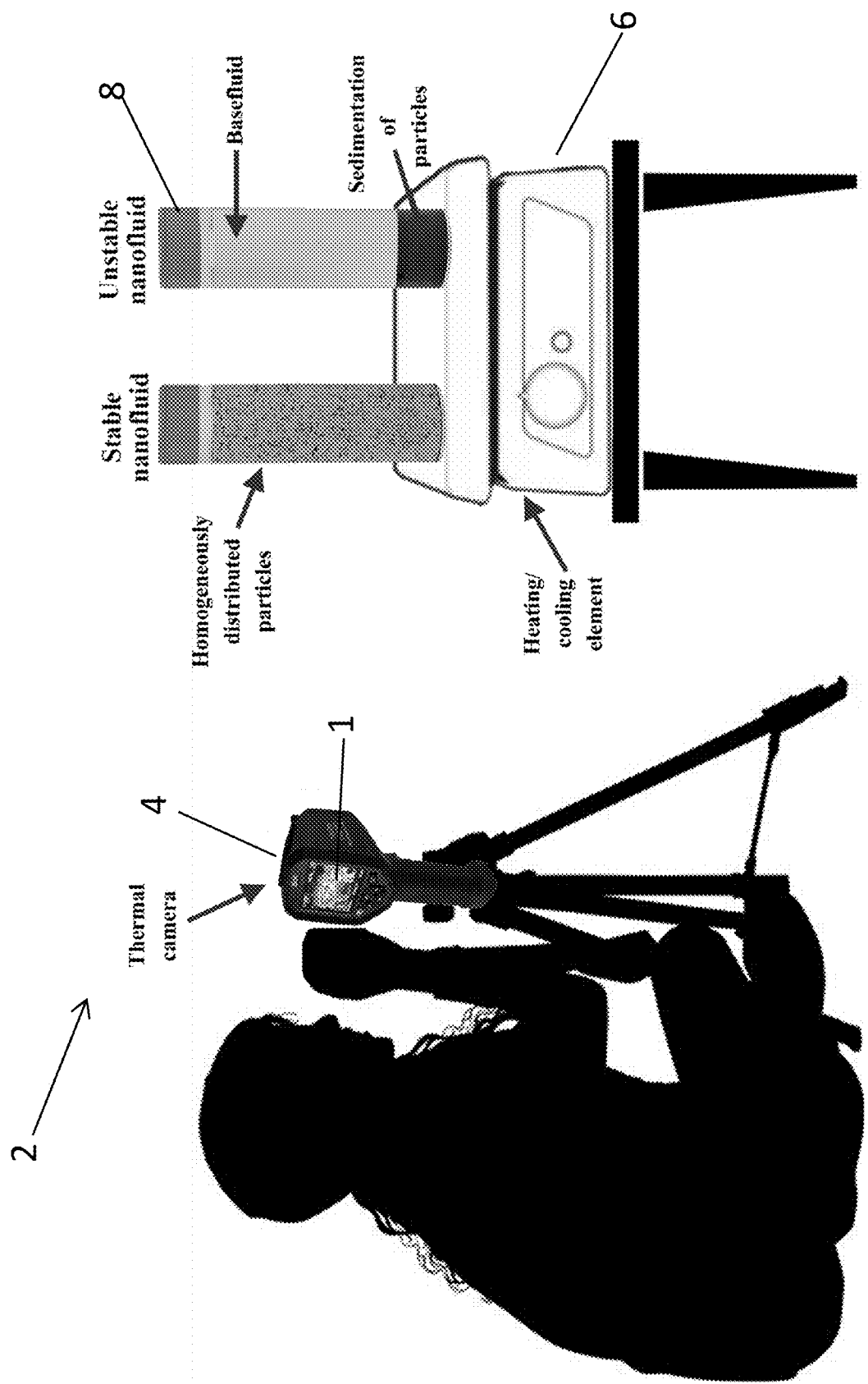
FIG. 1 illustrates an implementation of a system dynamically determining and adjusting a dispersion stability of particles in a suspension.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps. It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method for dynamically determining and adjusting a dispersion stability of particles in a suspension.

Liquids and solids are known to emit thermal radiation. The amount of thermal radiation emitted by these materials depends on their status temperature. This means, if the material is at a high temperature, its emitted thermal radiation will be higher, and vice versa. Moreover, the amount of thermal radiation emitted depends also on other factors, such as the material properties and emissivity. Emissivity is a measure of how efficiently a material emits thermal radiation. It is influenced by factors such as the temperature and optical properties of the material. Thermal radiation, often synonymous with infrared radiation (IR), can be detected by thermal imaging cameras. A thermal imaging camera, also known as a thermal imager, works by detecting and capturing the infrared (IR) radiation emitted by objects. These detected IR data are then converted into visual image and mapping different temperatures to different colors. Hotter areas appear brighter, while cooler areas appear darker. The color palette used in the thermal image typically ranges from cooler colors like blue for lower temperatures to warmer colors like red and yellow for higher temperatures.

In addition, thermal cameras highlight temperature differences, making it valuable for various applications, such as detecting heat leaks in buildings, identifying electrical issues, etc. One of its main advantages is that such a device (i.e., thermal camera) provides non-contact temperature measurement, allowing users to assess temperature variances without physical contact. Due to the capability of thermal cameras, it can also be used to measure the dispersion stability of suspensions. This is because homogeneously dispersed particles in a suspension will show a different thermal pattern than that of low dispersion stability or that with a high level of formed sedimentation in the suspension.

The present subject matter relates to a method and system for determining the physical stability of suspensions, including but not limited to both nanofluids and microfluids, both stationary (static), or flowing (dynamic) flow states using thermal imaging of samples as illustrated in FIG. 1. The dispersion stability analysis via the method described herein provides qualitative outcomes. In various implementations, it can be used to determine short-term and long-term dispersion stability of suspensions that are stationary or flowing. Furthermore, the container hosting the suspension can be made of any material such as, by non-limiting example, metal including copper, iron, aluminum, stainless steel and the like. In various implementations, the containers can also be made of, including but not limited to, plastic, including polyvinyl chloride (PVC), polyethylene, glass, and rubber. In various implementations, the container material should have a lower thermal conductivity than that of the dispersed particles.

In various implementations, the suspensions may be fabricated first. This can be done within the container hosting them or externally, then placing the suspensions in containers. Next, the containers may be placed on a heating/cooling element, such as by non-limiting example, a hot/cold plate device. The hot/cold plate may then be set to a temperature that is different than the sample temperature. In various implementations, the temperature of the hot plate may be higher than the sample. In other implementations, the hot/cold plate may be set at a temperature that is lower temperature than the sample temperature itself. Then, a thermal camera is used to capture the thermal radiation that is emitted from each sample, which is then converted into a visual thermal image as illustrated in FIG. 1, element 2 and FIG. 2, elements 10 and 12. The images of the samples may then be analyzed in terms of thermal distribution.

Figure 2:
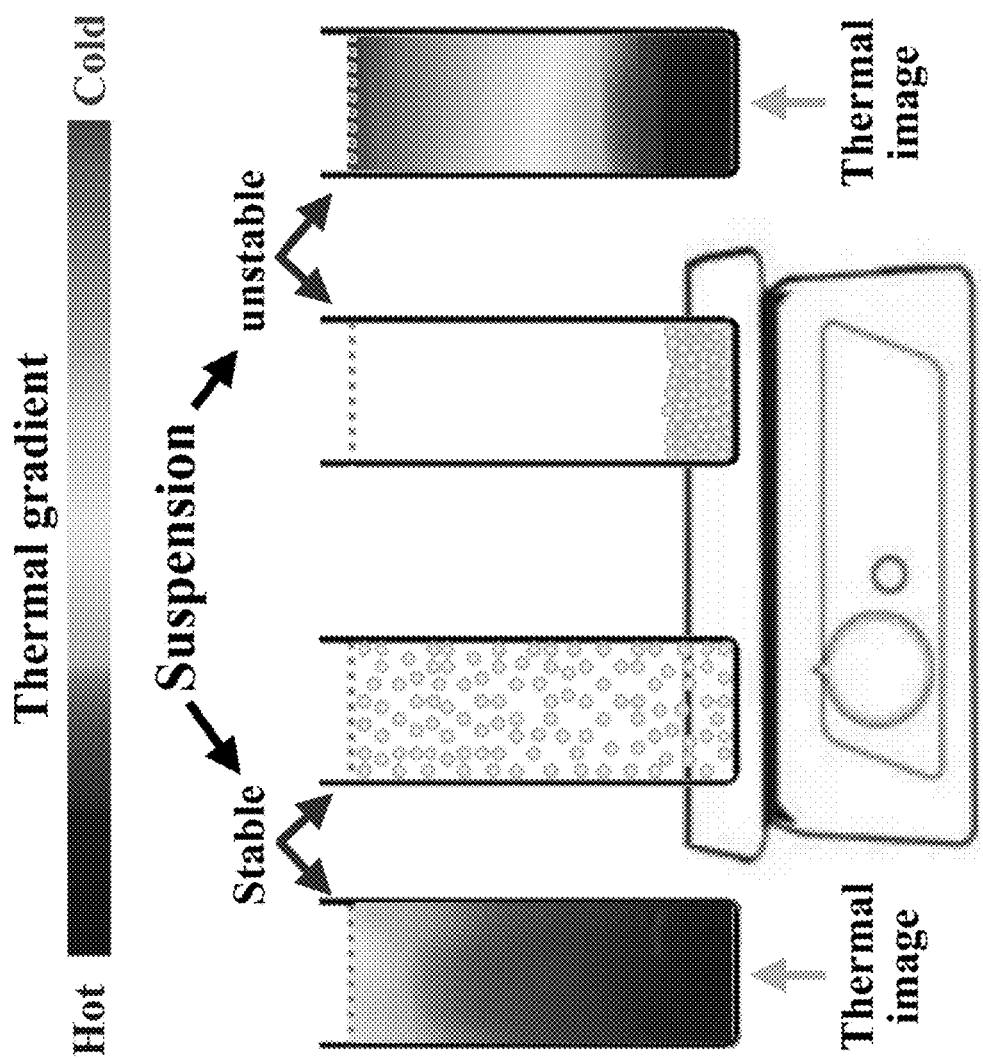
FIG. 2 illustrates thermal images of stable and unstable suspensions, where it shows the uniform (left) and non-uniform (right) thermal distribution.

Referring to FIG. 2 as an example, there are two samples, the first sample 10 has a high stability with homogeneously dispersed particles and the second sample 12 has a low stability with a high level of formed sedimentation. In this example, the heat distribution within the second sample 12 will be focused highly at the bottom due to the formed sediment having higher thermal conductivity, or higher heat transfer capability than the base fluid. The first sample 10 will have a more even heat distribution pattern due to the dispersion of particles homogeneously within the base fluid. This means that the effective thermal conductivity, or heat transfer capability, in each area in the vertical and horizontal axis of the sample should be, in theory, the same or very close to each other.

Figure 3:
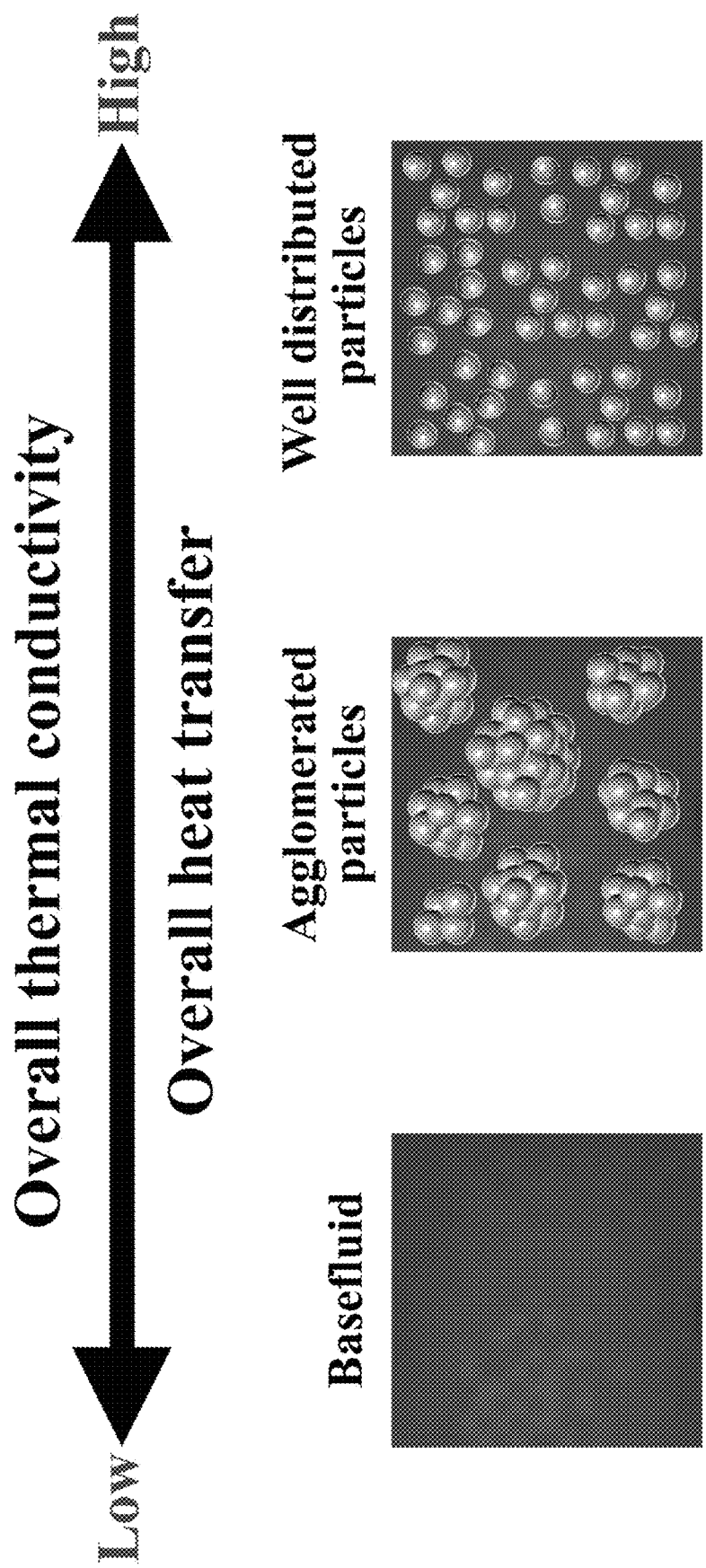
FIG. 3 illustrates an example of overall thermal conductivity and the resulting heat transfer for different scenarios.

Referring to FIG. 3, the effective, thermal conductivity as well as overall heat transfer for the different samples is illustrated. The different samples may include a pure base fluid 14, agglomerated particles 16, and well dispersed particles 18. As illustrated, the lowest values heat values are visible for the pure base fluid 14, and the highest heat values would be obtained when the particles are well distributed 18 in the hosting liquid, or base fluid.

Referring again to FIG. 1, an implementation of a system 2 for dynamically determining and adjusting a dispersion stability of particles is illustrated. The system includes a thermal camera 4. In various implementations, the thermal camera may be supported by a tripod as illustrated. In other implementations, the thermal camera may be handheld. In still other implementations, the camera may be any commercially available camera that can produce thermal images. The system can further include a mixing device. The mixing device may be configured to provide stirring to the suspension to dynamically maintain the suspension at a desired dispersion stability and temperature, thereby, adjusting the movement in the particles in the suspension by creating a change in energy. In various implementations, the mixing device may be a magnetic stirrer. In other implementations, the mixing device may be a probe or a sonicator, or another device capable of maintaining a suspension and/or moving particles in a suspension. The system may also include a heating and/or cooling element. The heating element may be a laboratory heating plate 6 as illustrated.

The system further comprises a container to house the suspension. In various implementations, the container may be formed of various materials, including metal, plastic, glass, and other previously mentioned materials. The container may have a lower thermal conductivity than that of the particles in the suspension.

The thermal camera of the system may be configured to calculate the dispersion stability of the particles in the suspension by: capturing a thermal radiation emitted from each of the particles in the suspension; converting, using a computer processor, the thermal radiation into a visual thermal image; analyzing, using the computer processor, the visual thermal images by thermal distribution of the particles; and calculating, using the computer processor, the dispersion stability of the suspension from the thermal distribution of the particles.

The present subject matter includes a method for dynamically determining and adjusting a dispersion stability of a suspension. The method can further include adjusting a dispersion stability of particles in a suspension The method may include providing a suspension having an initial temperature and an initial dispersion stability. A mixing device may be added to the suspension and a heating element, or a cooling element may be provided to maintain the suspension at a constant temperature. The heating or cooling element should not be set to the melting temperature of the particles or the boiling or freezing temperature of the base fluid. In various implementations, the heating element may include, but not be limited to, a handheld lighter such as a cigarette lighter or a device for lighting a barbecue grill. In other implementations, the cooling element may be ice or another material that is capable of lowering the temperature of the suspension. In various implementations, heating or cooling of the sample can range from about 1 minute to about 5 minutes (depending on the set temperature of the thermal device). The sample should not be kept on the heating/cooling element for a long duration. Otherwise, the temperature within the whole sample will reach an equilibrium point, after which the analysis cannot be conducted.

The method may include aiming a thermal camera at the suspension and capturing, using the thermal camera, a thermal radiation emitted from each of the particles in the suspension. In various implementations, the temperature difference between the sample and the heating device may be selected based on the resolution or accuracy of the thermal camera used. The method may then include converting, using a computer processor, the thermal radiation into a visual thermal image and analyzing, using the computer processor, the visual thermal images by thermal distribution of the particles. It is recommended that each sample be examined individually so that the thermal emissions generated from multiple samples do not intersect with each other and, thereby, affect the resolution of the obtained thermal image.

The method may also include calculating, using the computer processor, the dispersion stability and temperature of the suspension from the thermal distribution of the particles. The method may further include dynamically adjusting stirring provided by the mixing device to dynamically maintain the suspension at the initial temperature and the initial dispersion stability.

The suspension may be provided in a container. As previously described, the container may have a lower thermal conductivity than that of the dispersed particles in the suspension. In various implementations, the suspension may include a nanofluid containing nanoparticles dispersed in a base fluid. In other implementations, the suspension may include microparticles dispersed in a base fluid. The suspension may be maintained as a homogenous suspension. The suspension may be in a dynamic flow condition or a static flow condition.

In some implementations, the computer process may be located within the thermal camera. In other implementations, the computer may be remotely coupled to the thermal camera. In the method described above, determining the dispersion stability of particles in the suspension may take at least about 5 minutes to at least about 15 minutes.

Also, it is to be noted that the proposed stability analysis can be conducted directly after preparing the suspension and/or at a different period of time following the preparation. In various implementations, the same testing can be conducted with dynamic (i.e., flowing state) suspension given that it is running in a closed cycle. This is done by placing a heating or cooling element on one side of the pipe containing the suspension or on the collector tank. Moreover, the proposed stability approach can be applied to a single particle type suspension and for multiple (hybrid) particles suspension.

This method and system as described herein solves allows qualitative determination of the physical stability of suspensions at both stationary (i.e., static) and flowing (i.e., dynamic) flow states, determination of the dispersion stability for both nanofluids and microfluids, examination of the dispersion stability of suspensions in existing systems without the need of any modifications to the system itself (given that it is a closed system), and use of a heating/cooling element only when conducting the stability analysis.

The stability analysis can even be conducted in remote areas because it only requires a thermal camera (this is usually portable) and a heating/cooling source, such as a lighter or ice cubes.

Since the present method gives the user the freedom of heating or cooling to perform the analysis, suspensions that are affected by heating or by cooling can still be analyzed by using a suitable thermal source (i.e., heating or cooling source depending on the suspension).

The dispersion stability analysis proposed is rapid as the whole process would only require a period of time ranging from about 5 minutes to about 15 minutes.

The dispersion stability analysis described herein can have improved accuracy by using high accuracy thermal cameras, including an analysis of timing between the different samples, and controlling the surrounding atmospheric temperature.

The system and method described herein can be used in any application that uses suspensions. This includes, but is not limited to the oil industry (oil extraction through flooding with suspensions and liquid fuels that includes dispersed particles for improving their combustion efficiency), the energy sector (heat exchangers, solar collectors, air conditioning and refrigeration (AC&R) systems, and nuclear power reactors for energy output and for loss-of-coolant accident), the medical sector (medications in the form of suspensions, and inner body diagnostic imaging such as suspensions made of dispersed radioactive technetium), and other applications (car radiators and computer processors cooling).

It is to be understood that the system and method for dynamically determining dispersion stability of a suspension, and the resultant product and uses thereof, are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for dynamically determining a dispersion stability of a suspension, the method comprising:
providing a suspension having an initial temperature and an initial dispersion stability;
heating or cooling the suspension at a constant temperature;
aiming a thermal camera at the suspension;
capturing, using the thermal camera, a thermal radiation emitted from the suspension;
converting, using a computer processor, the thermal radiation into a visual thermal image;
analyzing, using the computer processor, the visual thermal images to calculate the dispersion stability and temperature of the suspension; and
mixing the suspension to dynamically maintain the suspension at the initial temperature and the initial dispersion stability.

2. The method of claim 1, wherein providing the suspension comprises making the suspension using one of a one step process or a two-step process, the one step process comprising dispersing particles in a hosting fluid in a single stage, and the two-step process comprising forming the particles into a powder form in a first stage and using a mixing device to mix the powder with a hosting fluid in a second, later stage.

3. The method of claim 2, wherein the suspension is transferred to a container, the container having a lower thermal conductivity than a thermal energy of the dispersed particles.

4. The method of claim 2, wherein the suspension comprises a nanofluid or a microfluid.

5. The method of claim 2, wherein the mixing device is selected from the group consisting of an ultra-sonicator, a homogenizer, and a magnetic stirrer.

6. The method of claim 1, wherein the heating is achieved by a heating element selected from the group consisting of a hot plate and a lighter and the cooling is achieved by ice cubes.

7. The method of claim 1, wherein the computer processor is located within the thermal camera.

8. The method of claim 1, wherein the computer processor is remotely coupled to the thermal camera.

9. The method of claim 1, wherein determining the dispersion stability of the suspension takes a period of time ranging from about 5 minutes to about 15 minutes.

10. The method of claim 1, wherein the suspension is in a static or dynamic flow condition.

11. The method of claim 1, wherein the mixing is achieved by a mixing device selected from the group consisting of a magnetic stirrer and a sonicator.

* * * * *